United States Patent [19]

Kunze

[11] 4,280,258

[45] Jul. 28, 1981

[54] CABLE SLEEVE HAVING A CLOSABLE, LONGITUDINAL SLIT

[75] Inventor: Dieter Kunze, Neuried, Fed. Rep. of Germany

[73] Assignee: Siemens Aktiengesellschaft, Berlin & Munich, Fed. Rep. of Germany

[21] Appl. No.: 34,127

[22] Filed: Apr. 27, 1979

[30] Foreign Application Priority Data

May 9, 1978 [DE] Fed. Rep. of Germany ....... 2820181

[51] Int. Cl.³ ..................... B65D 63/00; F16L 33/00
[52] U.S. Cl. ................................ 24/257; 24/16 PB; 24/30.5 P; 285/252
[58] Field of Search .................. 24/257, 16 PB, 17 B, 24/17 AP, 73 BP, 73 FA, 30.5 R, 30.5 S, 30.5 P; 285/252; 138/156

[56] References Cited

U.S. PATENT DOCUMENTS

| | | | |
|---|---|---|---|
| 2,064,432 | 12/1936 | Keidel | 24/30.5 R |
| 2,319,316 | 5/1943 | Gerendas | 24/259 R |
| 2,533,539 | 12/1950 | Vivian | 24/30.5 R |
| 2,570,663 | 10/1951 | Guarino | 24/257 |
| 2,586,931 | 2/1952 | Gammon | 24/30.5 R |
| 3,057,446 | 10/1962 | Lang | 138/156 |
| 3,141,221 | 7/1964 | Faulls, Jr. | 24/30.5 R |
| 3,455,336 | 7/1969 | Ellis | 24/16 PB |
| 3,571,861 | 3/1971 | Olson | 24/30.5 P |
| 3,693,864 | 9/1972 | Wilkins | 24/30.5 R |

Primary Examiner—Victor N. Sakran
Attorney, Agent, or Firm—Hill, Van Santen, Steadman, Chiara & Simpson

[57] ABSTRACT

A cable sleeve, which has a closable, longitudinal slit and is a tubular member of shrinkable material, has a closure formed by a pair of overlapping edge portions, which extend along the longitudinal slit. The outer edge portion has a bead formed by a fold which extends the length of the edge portion and forms a longitudinally extending groove opening toward the inner edge portion, which has an outwardly extending bead snappably engaged in said groove to form a sealed relationship. A support clamp is disposed on the fold of the outer edge portion to engage the fold adjacent the opening to hold the bead of the inner edge portion in the groove.

4 Claims, 6 Drawing Figures

CABLE SLEEVE HAVING A CLOSABLE, LONGITUDINAL SLIT

BACKGROUND OF THE INVENTION

1. Field of the Invention

The present invention is directed to a cable sleeve, which consists of a shrinkable material and has a closable, longitudinally slit, and a closure for closing the slit.

2. Prior Art

Longitudinally extending hose-shaped covering or cable sleeves of thermoplastic synthetic material with a form memory and with a longitudinally extending interface are known and disclosed in German OS No. 1,525,815. This interface exhibits a bead on both sides of the slit over which beads a C-shaped clamp can be drawn to hold the divided bead together to close the slit.

SUMMARY OF THE INVENTION

The present invention is directed to a cable sleeve which has a closable, longitudinally extending slit and is a tubular member of shrinkable material. The cable sleeve includes all the parts required for forming a closure for the slit so that the slit can be closed after application of the sleeve without any additional auxiliary means solely by means of heating the shrinkable member. This object is inventively achieved in that the cable sleeve has mutually overlapping edge portions in the area of the slit and that the overlapping edge portions form a closure for the longitudinal slit with the outer edge portion of the pair having a bead being formed by a fold or crimp extending the length of the edge portion and forming a longitudinally extending groove opening toward the inner edge portion of the pair. The inner edge portion has a longitudinally extending bead extending outwardly towards the groove and snappable into the groove to hold the edge portions together in a sealed relationship and a support clamp is disposed on the bead of the outer edge portion to engage the fold adjacent the opening to hold the bead of the inner edge in said groove.

The essence of the invention is that a tubular member, which has a longitudinal slit and consists of a thermoplastic material, can be employed in the simple manner on cut as well as uncut cables as a cable sleeve without requiring any adaptation work with tools, which under certain conditions can be expensive to utilize. The closing of the slit is accomplished by areas of the member adjacent the slit in a simple manner with a closure system in which all required component parts are already present on the cable sleeve. The closure area is designed by two overlapping edge portions of the cable sleeve which cover the slits so that the best possible stability is achieved precisely in the critical area where stability produces the pre-condition for a sure seal. The mutual overlapping edges or edge portions are simultaneously designed as closure elements with the inner edge portion of the closure area having a longitudinal bead projecting outward toward the outer edge portion, which bead is engaged in a groove or channel formed by a fold or crimp in the outer edge portion. This fold or crimp in the outer edge portion extends longitudinally on the outer surface of the outer edge portion and provides an undercut channel or groove, which enables the bead on the inner edge portion to be snapped into the groove along the entire length of the closure area. Thus, a completely problem free closure, which is produced by means of a simple snapping together of the two closure elements, is guaranteed. This effect is additionally promoted by means of a support clamp, which is already provided and permanently mounted on the outer bead of the cable sleeve. This support clamp embraces the outer surfaces of the fold or crimp forming the bead of the outer portion so that a clamping effect occurs on the fold at its narrowest point adjacent the opening of the groove. Various embodiments are specified for the support clamp, which embodiments are all aimed at facilitating the assembly of the cable sleeve and guarantee the necessary support and mutual guidance of the closure elements in the sealing area during a shrinking process. The support clamps preferably consist of metal and are shaped in such a manner that they are adjacent to the bead without interruption insofar as possible but provide a certain amount of flexions in the closure area. However, a support rail or clamp of a plastic of substantially rigid but still partially elastic synthetic plastic is possible; however, it must be guaranteed that the materials of the plastic have a more solid consistency at the shrinking temperature than the materials forming the cable sleeve, the beads which becomes rubbery during the shrinking process.

DESCRIPTION OF THE PREFERRED EMBODIMENTS

Figure 1:
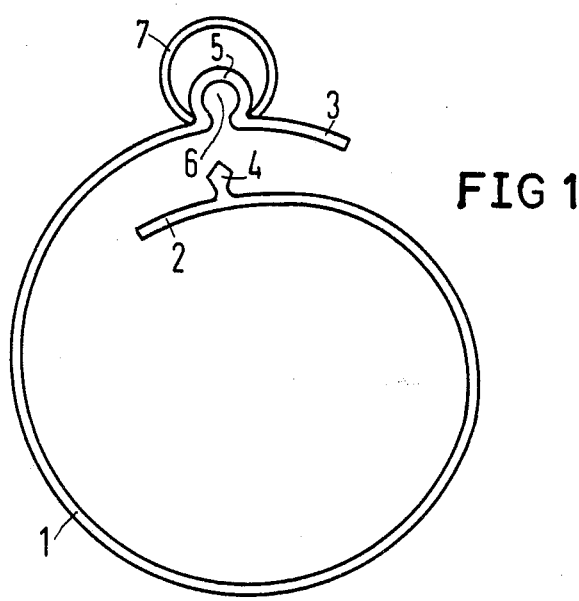
FIG. 1 is an end view of a cable sleeve with a closure in accordance with the present invention.

The principles of the present invention are incorporated in a cable sleeve or tube 1 illustrated in FIG. 1. The cable sleeve 1 has a slit, which extends in a longitudinal direction and is covered over by overlapping edge portions 2 and 3 after assembly of the cable sleeve on the cables. As already mentioned, the edge portions 2 and 3 extend in overlapping relationship to one another in the closure area in order to guarantee a support during the assembly and during the shrinking process. The outer edge portion 3 has a bead 5, which extends over the entire length of the cable sleeve 1 and which bead 5 is shaped by an undercut crimp or fold, which forms a channel or groove 6 that opens inwardly toward the inside of the tube or member 1. The inner edge portion 2 is provided with a bead 4, which projects toward the outside and which extends over the entire longitudinal length of the cable sleeve 1. As illustrated, the projection or bead 4 has a neck portion adjacent the edge portion 2, which expands into a head removed from the edge portion. The outer bead 5 is also provided with a support clamp 7, which engages both sides of the fold forming the bead 5 at its narrowest part so that the bead is elastically held together at the opening edge of the groove or channel 6. Upon assembly, the bead 4 is snapped into the channel or groove 6 of the bead 5. In the final step of the closing process, the cylindrical cable sleeve 1 is subsequently shrunken onto the cable ends or the elements held therein by heating.

Figure 2:
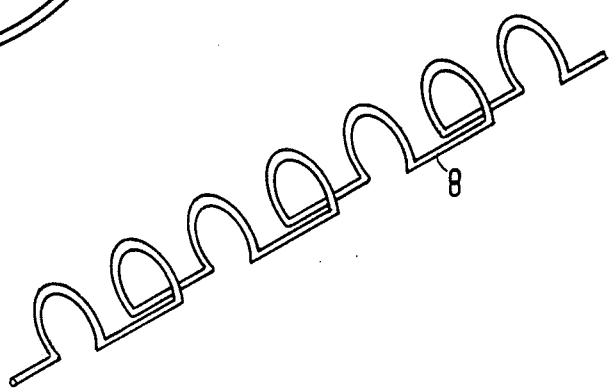
FIG. 2 is a perspective view of one example of a clamp support.
Figure 3:
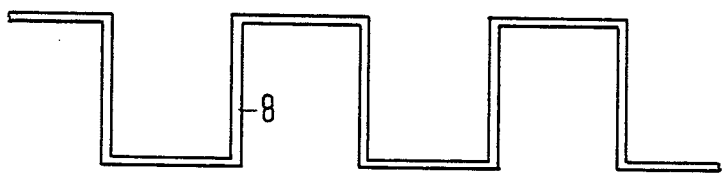
FIG. 3 is a plan view of a clamp support illustrated in FIG. 2.

FIGS. 2 and 3 show an example of a support clamp, which can be used as clamp 7 of FIG. 1. The support clamp 8 of FIGS. 2 and 3 consist of a wire-like structure or element, which has been bent in a meander-like pattern with substantially right-angle bends between the various legs or portions as illustrated in FIG. 3. Subsequently, this meander-form is finally brought into a curved form illustrated in FIG. 2, so that an end view will have a C-shaped cross section. When the clamp is mounted on the bead 5 of the cable sleeve 1, the support clamp 8 will have adjacent longitudinal portions contacting opposite sides of the bead 5 but with the application of the pressure on both sides being interrupted and the point of application on one side being offset from the point on the opposite side.

Figure 4:
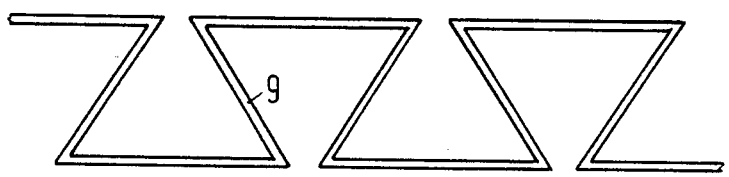
FIG. 4 is a plan view of an embodiment of a clamp support.

To provide a pressure distribution by means of a support clamp along the bead so that it is significantly more uniform, the clamp can have a configuration such as illustrated in FIG. 4. The clamp 9 of FIG. 4 has bends which are greater than 90 degrees so that a series of trapezoidal shaped members are formed with the leg or portion engaging one side overlapping portions of the portions or legs engaging the opposite side to provide a more uniform pressure but still allow for flexibility or bending of the tube 1. In both the embodiments of FIGS. 3 and 4, the required flexibility in the bead area is guaranteed by means of the wire-like member used to form either the support clamp 8 or 9.

Figure 5:
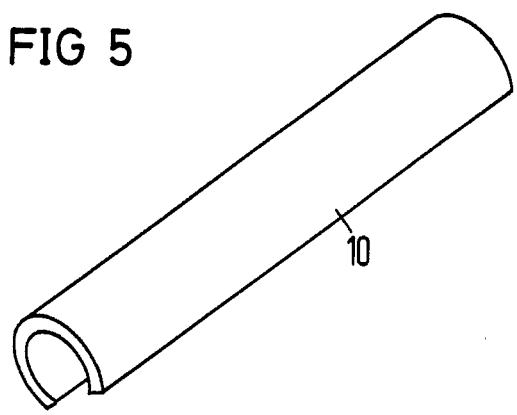
FIG. 5 is a perspective view of another embodiment of a clamp support consisting of a plastic material.

In the embodiment illustrated in FIG. 5, the support clamp 10 is of a rigid plastic material having a C-shaped cross section. The material forming the clamp 10 has a solidity, which is higher than that of the shrinkable material of sleeve 1, particularly in the warm state, for example, a sleeve of vulcanized polyethylene. This support clamp 10 is likewise premounted on the bead 5 and thus completely corresponds to the object of the present invention.

Figure 6:
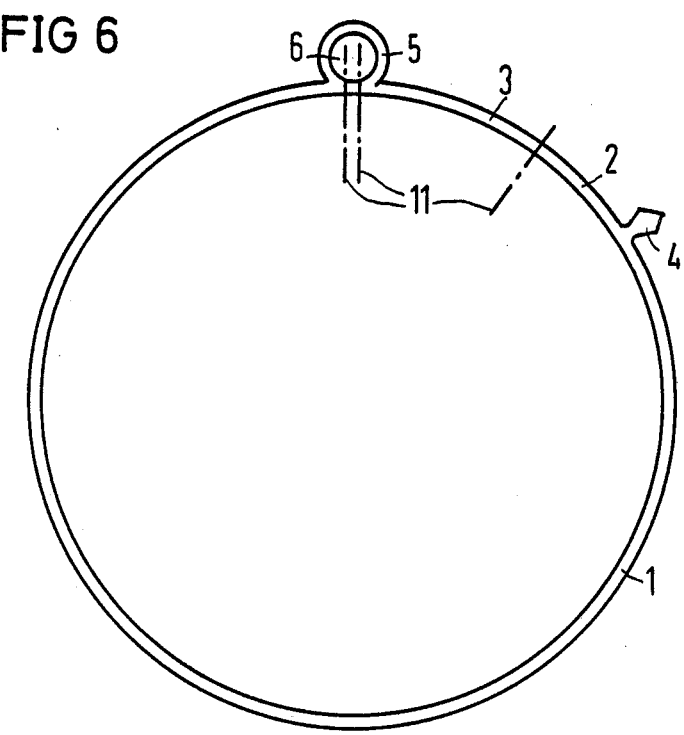
FIG. 6 is an end view of an extruded member, which will subsequently form the cable sleeve illustrated in FIG. 1.

The cable sleeve 1 can be easily manufactured by any simple manner by means of extruding an element illustrated in FIG. 6. As illustrated, the element of FIG. 6 has a greater diameter than the final diameter of the cable sleeve 1 and the element is cut along the lines 11 to separate the edge portion 2 having the bead 4 from the edge portion 3 having the bead 5 and to form an opening for channel 6 above bead 5.

It should be pointed out that the closure of the cable sleeve 1 is accomplished in a simple manner by means of snapping the bead 4 into the groove or channel formed by the fold or crimp of the bead 5 and that the pressure forces which are utilized are radially applied, since the support clamp is already premounted as a spring element. In contrast thereto, the application of a closing rail or clamp for holding together the beads in the already known type of cable sleeve always involves applying a force in an axial direction of the sleeve, and this type of axial force usually requires additional tools.

Although various minor modifications may be suggested by those versed in the art, it should be understood that I wish to embody within the scope of the patent granted hereon all such modifications as reasonably and properly come within the scope of my contribution to the art.

I claim:

1. A cable sleeve having a closable, longitudinal slit extending therealong, said sleeve being a tubular member of shrinkable material and having a closure for said slit, said closure being a pair of overlapping edge portions of the member extending along the longitudinal slit, the outer edge portion of the pair having a bead being formed by a fold extending the length of the edge portion and forming a longitudinally extending groove opening towards the inside of the tubular member and the inner edge portion of the pair of edge portions, said inner edge portion having a longitudinally extending bead extending outwardly towards the groove and being snappable into said groove to hold the edge portions together in a sealed, overlapping relationship, and a support clamp being disposed on the bead of the outer edge portion to engage the fold adjacent the opening to hold the bead of the inner edge portion in said groove.

2. A cable sleeve according to claim 1, wherein said support clamp comprises a wire member having a meander like form and having a shape so that adjacent portions engages opposite sides of the fold.

3. A cable sleeve according to claim 1, wherein said support clamp is a wire member bent into oppositely facing trapezoidal shapes having parallel portions and having a shape so that adjacent parallel portions engage opposite sides of the bead of the outer edge portion.

4. A cable sleeve according to claim 1, wherein said support clamp comprises a plastic rigid element having a C-shaped cross section.

* * * * *